(12) United States Patent
Artemenko et al.

(10) Patent No.: US 10,630,460 B2
(45) Date of Patent: Apr. 21, 2020

(54) MICROWAVE COMMUNICATION APPARATUS WITH MULTI-CHANNEL RADIO FREQUENCY MODULE AND CONTINUOUS BEAM SCANNING AND METHOD FOR ELECTRONIC BEAM SCANNING

(71) Applicant: LIMITED LIABILITY COMPANY "RADIO GIGABIT", Nizhny Novgorod (RU)

(72) Inventors: Aleksey Andreevich Artemenko, Nizhniy Novgorod (RU); Andrey Viktorovich Mozharovskiy, Nizhniy Novgorod (RU); Sergey Alexandrovich Tikhonov, Sarov (RU); Alexandr Sergeevich Myskov, Nizhniy Novgorod (RU); Roman Olegovich Maslennikov, Nizhniy Novgorod (RU)

(73) Assignee: LIMITED LIABILITY COMPANY "RADIO GIGABIT", Nizhny Novgorod (RU)

( * ) Notice: Subject to any disclaimer, the term of this patent is extended or adjusted under 35 U.S.C. 154(b) by 0 days.

(21) Appl. No.: 16/247,150

(22) Filed: Jan. 14, 2019

(65) Prior Publication Data
US 2019/0222408 A1    Jul. 18, 2019

(30) Foreign Application Priority Data

Jan. 12, 2018   (RU) .............................. 2018101163

(51) Int. Cl.
*H04L 7/033*    (2006.01)
*H04B 1/38*     (2015.01)
*H04B 7/06*     (2006.01)

(52) U.S. Cl.
CPC ............. *H04L 7/0331* (2013.01); *H04B 1/38* (2013.01); *H04B 7/0617* (2013.01)

(58) Field of Classification Search
CPC .. H04M 11/06; H04M 11/062; H04L 25/4927
(Continued)

(56) References Cited

U.S. PATENT DOCUMENTS

| 7,844,217 B2 | 11/2010 | Charash | |
| 2002/0027886 A1* | 3/2002 | Fischer | H04L 1/0003 370/255 |

(Continued)

FOREIGN PATENT DOCUMENTS

| EP | 3119014 A1 | 1/2017 |
| RU | 40557 U1 | 9/2004 |
| RU | 2530330 C1 | 10/2014 |

OTHER PUBLICATIONS

Search Report with regard to the counterpart RU patent application No. 2018101163 completed on Aug. 21, 2018.
(Continued)

*Primary Examiner* — Khai Tran
(74) *Attorney, Agent, or Firm* — BCF LLP

(57) ABSTRACT

The invention comprises at least two antenna elements; at least two radio frequency units, which are connected to an antenna element; digital modem, comprising receiving and transmitting blocks, received signal distribution network, connected with radio frequency units and receiving block and is capable to forward the received signal from units to the receiving block; transmitted signal distribution network, connected with units and transmitting block and is capable to forward the transmitted signal from the transmitting block to the units; beamforming module, connected with receiving and transmitting blocks through the control channels; wherein said apparatus also comprises a clock generator and a clock signal distribution network connected with the clock (Continued)

generator and with radio frequency units, wherein each unit comprises variable gain blocks and a voltage-controlled oscillator with a phased locked loop synthesizer with a fractional and programmable divider, wherein the beam-forming module is connected with units through command channels.

19 Claims, 4 Drawing Sheets

(58) Field of Classification Search
USPC .................................................. 375/222, 257
See application file for complete search history.

(56) References Cited

U.S. PATENT DOCUMENTS

| | | | |
|---|---|---|---|
| 2010/0022211 A1* | 1/2010 | Huang | H03G 3/3052 455/232.1 |
| 2011/0195657 A1 | 8/2011 | Takeda et al. | |
| 2016/0013550 A1* | 1/2016 | Artemenko | H01Q 3/245 370/280 |

OTHER PUBLICATIONS

English Abstract for RU40557 retrieved on Espacenet on Jan. 14, 2019.

* cited by examiner

MICROWAVE COMMUNICATION APPARATUS WITH MULTI-CHANNEL RADIO FREQUENCY MODULE AND CONTINUOUS BEAM SCANNING AND METHOD FOR ELECTRONIC BEAM SCANNING

CROSS-REFERENCE

The present application claims convention priority to Russian Utility Patent Application No. 2018101163, filed on Jan. 12, 2018, entitled "MICROWAVE COMMUNICATION APPARATUS WITH MULTI-CHANNEL RADIO FREQUENCY MODULE AND CONTINUOUS BEAM SCANNING AND METHOD FOR ELECTRONIC BEAM SCANNING", the entirety of which is incorporated herein by reference.

FIELD OF THE TECHNOLOGY

The non-limiting embodiments of the present technology are generally related to the field of radio communications and, more specifically, to microwave communication apparatuses with electronic beam scanning of millimeter wave band dedicated for high throughput wireless point-to-point and point-to-multipoint communication systems.

BACKGROUND

A millimeter wave band becomes rather advanced for development of various wireless communication systems in the last decades. Advantages of such systems involve a possibility to operate in a wide bandwidth of transmitting signals to several GHz and an increasing of a bit rate to several Gbit/s. For example, the frequency range of 57-66 GHz is used in local wireless systems IEEE 802.11ad and WiGig which are license free in many counties. The frequency range of 71-76/81-86 GHz is even more popular and is usually used for radio relay point-to-point or point-to-multipoint communication systems.

The level of received signal power in millimeter wave range is less than signal power in traditional systems that use lower frequency band (assuming gains and distances the same). So, the level of received signal power for 60-90 GHz frequency band is 20 dB less than for frequency bands of 2, 4 and 5 GHz. Due to this fact antennas with high gain and narrow radiation pattern with the width of the main lobe about 1-5° is used in millimeter wave systems.

A narrow beam leads to two main disadvantages: difficulty in antenna alignment and sensitivity to twists and sways of supporting structures. Both disadvantages lead to increase of operating expenses of equipment services and personnel services at the object for additional antenna alignment. The problem may be solved by the non-limiting embodiments of the present technology of effective microwave communication apparatus with electronic beam scanning.

The interest in developing of various scanning antennas with high gain and of various types was caused by realization of mentioned requirements to antennas of millimeter wave band. There were some efforts to adapt phase arrays for operating in millimeter wave band. But it is difficult to realize array with a large number of antenna elements, thus, new technologies are required.

Aperture antennas with several feed antenna elements placed in a focal plane of a collimating device were described. A signal between this antenna elements is carried by microwave switches. If the signal is transmitted only to one of antenna elements the collimating device forms a radiation pattern with a predefined beam direction. In light of the above, switching between antenna elements provides switching between different beam directions. The main disadvantage of such method is losses associated with beam switching. The higher frequency leads to larger losses. Sometimes the result of such losses exceeds all the advantages of using antennas with the high gain.

The above problem was sold in the patent No RU2530330 which was published at Oct. 10, 2014. FIG. 1 shows the functional diagram of a radio relay communication system (100) described in patent No RU2530330. The system comprises a digital modem (10), a multi-channel radio frequency module (20) and a passive part of an antenna (30). In this embodiment of the technology the digital modem (10) is connected to a Digital-to-Analog Converter (DAC) (60) and an Analog-to-Digital Converter (ADC) (50) units and comprises a modem reception part (11) for processing a received signal and a modem transmission part (12) to form a transmitted signal and a beamforming module (40) connected to the modem reception part (11) and to the modem transmission part (12) through control channels (41). A received signal distribution block (21) and a transmitted signal distribution block (22) are connected with DAC (60) and ADC (50) units and with radio frequency units 1RF, 2RF, . . . NRF, that are included into the multi-channel radio frequency module (20). In the disclosed technology the beamforming module (40) is connected with the received signal distribution block (21) and the transmitted signal distribution block (22) through command channels and is not connected to the radio frequency units 1RF, 2RF, . . . NRF. Each radio frequency block 1RF, 2RF, . . . NRF is connected to one of the antenna elements 1AE, 2AE, . . . MAE of the passive part of the antenna (30). In this embodiment a signal that was generated in the modem transmission part (12) of the digital modem (10) is transmitted to the DAC (60) to form the signal on video frequency. This signal is transmitted on the input of the transmitted signal distribution block (22) which realizes the choice corresponding to the command signals from the beamforming module (40) of at least one of radio frequency units 1RF, 2RF, . . . NRF to form the signal on carrier frequency. The signal of carrier frequency flows to the at least one of antenna elements 1AE, 2AE, . . . MAE for transmission in directions of corresponding antenna elements. Further the received signal of carrier frequency that chosen by the received signal distribution block (21) to form the signal on video frequency from these directions flows to the at least one of the radio frequency units 1RF, 2RF, . . . NRF. The signal on the video frequency flows through the ADC (50) to the input of the modem reception part (11) for demodulation.

The beamforming module (40) according to the patent No RU2530330 is realized like a digital logic block and generates the command signals for the received signal distribution block (21) and the transmitted signal distribution block (22) which are based on the information that is received from the modem reception part (11) and the modem transmission part (12) through the control channels (41). The command signals flow to the received signal distribution block (21) and the transmitted signal distribution block (22) through the command channels (42). The received signal distribution block (21) and the transmitted signal distribution block (22) choose (switch) at least one radio frequency unit for processing the received signal and forming the transmitted signal corresponding to the command signals (for example, constant voltage signals to change the position of a switch). Among this the radio frequency units that were chosen are connected to the antenna elements and feeding of this antenna elements forms beams of radiation patterns of a scanning antenna in pre-defined directions.

Russian patent RU2530330 discloses that each of the received signal distribution block (21) and the transmitted signal distribution block (22) of this invention comprises at least one low frequency analog switch between several directions. Thus, the major mode is to choose only one radio frequency unit to transmit the signal in direction that is determined by the number of an active antenna element. In result a beam scanning is provided only by several prior known antenna directions. In other words, discrete scanning is provided without the opportunity to establish a continuous beam coverage area.

In one embodiment of the technology the received signal distribution block (21) and the transmitted signal distribution block (22) are implemented with the possibility to transfer a signal to several radio frequency blocks simultaneously. It allows to use the invention by a way of a radio relay communication system operating in a point-to-multipoint mode, but with discrete beam directions.

The station according to the patent No RU2530330 allows to use several types of scanning antennas without losses during beam switching because both distribution blocks are placed on a video frequency, so before or after the moment of mixing the signal to the high carrier frequency where such distribution may be with large insertion losses.

The disadvantage of the prototype is impossibility of a continuous beam scanning. In the prototype beam scanning may be only in discrete beam directions that is determined according to quantity and placement of feed antenna elements and according to distances between antenna elements along a focal plane of a collimating device. It is impossible to reduce these distances because of fixed dimensions of the antenna elements. In result there are intervals between beam directions. Due to these intervals minimum gain of an antenna is reduced so the quality of communication is reduced also. Elimination of such intervals in gain is a design goal and the solution will allow to improve quality of radio relay communication systems operating in the millimeter wave band.

Another disadvantage is limited power output of the station that is defined by the maximum power of each radio frequency unit. All not active radio frequency units are turned off or stay passive but it increases complexity of the design and reduces power usage effectiveness of radio relay station.

The advantage of the present invention is an continuous coverage area of the scanning antenna of the microwave communication apparatus with electronic beam scanning that is achieved without further signal losses.

SUMMARY

The advantage of the present technology is achieved by using the claimed microwave communication apparatus comprising at least two antenna elements, at least two radio frequency units, wherein each radio frequency unit is connected with at least one antenna element, a digital modem with receiving and transmitting blocks, a received signal distribution network connected with the radio frequency units and with the receiving block of the digital modem, said network capable to apply the received signal from the radio frequency units through an analog-to-digital converter (ADC) to the receiving block of the digital modem, a transmitted signal distribution network connected with the radio frequency units and with the transmitting block of the digital modem, said network capable to apply the transmitted signal from the transmitting block of the digital modem through a digital-to-analog converter (DAC) to the radio frequency units, and a beamforming module connected with the receiving and transmitting blocks of the digital modem through control channels, wherein said microwave communication apparatus also comprises a clock generator and a clock signal distribution network connected with the clock generator and with the radio frequency units, wherein each radio frequency unit comprises variable gain blocks and a voltage-controlled oscillator with a phased locked loop synthesizer with a fractional and programmable divider, wherein the beamforming module is connected with the radio frequency units through command channels.

In accordance with the non-limiting embodiments of the present technology a single clock generator for all radio frequency units is used, and a clock signal is split into several ways by the clock signal distribution network. It allows to exclude frequency and phase drifts between signals of different radio frequency units during operation (and after adjustment).

Each radio frequency unit comprises a voltage-controlled oscillator with a phased locked loop synthesizer with a fractional and programmable divider. That structure allows to perform adjustment and synchronization of a phase between signals of different radio frequency units. It is achieved by a short deviation of the fractional and programmable divider of the phase synthesizer on the adjusted radio frequency unit. In result the frequency of this unit is temporarily changed a little comparing with other radio frequency units, and a relative phase begins linear increasing in time. The relative phase stops to change after returning of the fractional and programmable divider to its original value. By this way the value of this phase may be different including zero and it provides a full phase synchronization. Such setting may be consequently performed in each radio frequency unit from the second to achieve a phase synchronization or a desired phase distribution between all radio frequency units.

A beamforming module is connected with radio frequency units through command channels and controls a fractional and programmable divider.

A desired phase distribution over the antenna elements is possible due to mentioned method of a phase adjustment. It allows to form arbitrary beam direction inside a beam scanning coverage area. In this case a step in such directions is defined by resolution of fractional and programmable divider of a frequency synthesizer rather than by a number of feed antenna elements. State-of-the-art realization of such synthesizes allows to achieve resolutions of fractions of Hz that reduces the discrete in beam directions. Hence, an unobvious advantage is achieved which is expressed in a continuous beam scanning provided by the claimed microwave communication apparatus.

In one embodiment a microwave communication apparatus further comprises a collimating device with a focal plane. In one of the more specific embodiments feed antenna elements are located on the focal plane of the collimating device. A distance between antenna elements is selected to provide less than −5 dB overlap between main beams of radiation patterns formed by each antenna element individually.

A high gain is achieved due to the presence of the collimating device in this embodiment. It is important for microwave and millimeter wave bands since it is needed to provide long distances of wireless-connections.

Moreover, in such embodiment the method for beamforming is changed. There are aperture antennas where a beam deviation is determined by a displacement of an active antenna element relative to an axis of a collimating device and not by a phase distribution of a signal over antenna elements. In result it is necessary to provide a synchronization of antenna elements and a desired amplitude distribution. The amplitude distribution may be balanced between antenna elements or concentrated on a single antenna element turning other into a passive state.

In said embodiment of the technology the beamforming module and the frequency synthesizer control parts of the radio frequency units with a controlled gain. Corresponding gain may be set small for reducing the power of one of the antenna elements or large for power improvement.

Moreover, there is an opportunity of activation of several closely spaced antenna elements, and it causes the displacement of the phase center and beam deviation by arbitrary value. It provides the claimed continuous area of beam scanning.

In another embodiment a collimating element is a parabolic dish or a thin dielectric lens or a Luneburg lens or a hemielliptic lens with an extension, whereas a focal plane of the lens coincides with the backside surface of the extension.

In a further embodiment one of radio frequency units is a radio frequency unit of a transmitter and the others are radio frequency units of a receiver. Such an embodiment is used in radars and imaging systems.

In one embodiment all radio frequency units are radio frequency transceiver modules. Such an embodiment is used in wireless communication systems.

In one another embodiment radio frequency units are the units based on direct frequency conversion architecture. In one of the more specific embodiments the radio frequency units are the units based on superheterodyne architecture and at least one voltage-controlled oscillator is programmed over frequency.

In another embodiment antenna elements are the elements with two orthogonal polarizations. In one of the more specific embodiments an output port for one of two polarizations of each antenna element is connected with a transmitting portion of one radio frequency unit, while an output port for another polarization—with a receiving portion of the same radio frequency unit.

In other embodiment a microwave communication apparatus operates in time division duplexing mode for receive and transmit signal separation. Time division mode for receive and transmit signal separation is provided with polarization isolation, whereas switching between receive and transmit regimes is excluded for reduction of losses.

In another one embodiment received and transmitted signal distribution networks comprise switches. In one of the more specific embodiments received and transmitted signal distribution networks comprise power splitters/combiners. When received or transmitted signal distribution network comprise power splitters a beamforming module controls the switches and the position of the switches and in another embodiment it is not necessary because separated signals are fed through radio frequency units with different gains determined by the beamforming module. It provides the application of the signal to the corresponding antenna elements.

In one embodiment a microwave communication apparatus comprises microwave switches between antenna elements and at least one of radio frequency units. In this case scanning with a beam switching is provided additionally together with a continuous beam scanning. This embodiment may be used when it is necessary to increase a number of antenna elements and to increase a field of antenna view.

In one embodiment carrier frequency signals on the outputs of the radio frequency units are synchronized in phase.

In one another embodiment carrier frequency signals on the outputs of the radio frequency units are equal in amplitude.

In a further embodiment all not active radio frequency units are turned off. To make a decision about turning off a radio frequency unit there may have a threshold for specific gain value. Turning off of not active radio frequency units allows to reduce power consumption of the apparatus and to improve energy saving.

In one embodiment the apparatus additionally comprises several analog-to-digital and digital-to-analog converters and received and transmitted signal distribution networks are implemented as digital logic blocks in the digital modem.

In other embodiment a microwave communication operates as a point-to-point or point-to-multipoint communication system.

In another embodiment a carrier frequency is in the 71-76 GHz band.

The non-limiting embodiments of the present technology also discloses a method for electronic beam scanning in microwave communication apparatus comprising the steps: A) phase synchronization of the signals at the outputs of at least two radio frequency units using a short deviation in a fractional divider of the phased lock loop for the voltage-controlled oscillator in the frequency synthesizer used in at least one radio frequency unit; B) calculation of the target spatial position of a beam in the beamforming module using control information taken from the receiving and transmitting blocks of the digital modem through the control channels; C) definition by the beamforming module of power weight coefficients for signals at the outputs of at least two radio frequency units, such coefficients defined to provide the target beam spatial position; D) applying command signals corresponding to the power weight coefficients through command channels to the variable gain elements of the radio frequency units; E) applying data signals to received and transmitting signal distribution networks.

BRIEF DESCRIPTION OF THE DRAWINGS

Components, features, and advantages of the non-limiting embodiments of the present technology will be apparent from the following description and drawings corresponding to the specific embodiments.

Numbers on the figures represent the following elements.

200—microwave communication apparatus; 10—a digital modem; 20—a multi-channel radio frequency module; 30—a passive part of an antenna; 1 . . . NRF—radio frequency units; 1 . . . MAE—antenna elements, 11—a modem reception part, 12—a modem transmission, 40—a beamforming module; 41—control channel; 42—command channel; 50—an analog to digital converter (ADC); 60—a digital to analog converter DAC); 21—a received signal distribution block; 22—a transmitted signal distribution block; 23—a clock generator; 24—a clock signal distribution network; 31—a collimating device; 71—a low noise amplifier; 72—a power amplifier; 73—a down-conversion mixer; 74—an up-conversion mixer; 75—a variable gain blocs in receiver chain; 76—a variable gain blocks in transmitter chain; 77—a power divider; 78—a voltage-controlled oscillator; 79—a frequency divider; 81—a frequency synthesizer; 811—a fractional and programmable divider; 812—a phase-frequency detector; 82—a phase locked loop filter.

DETAILED DESCRIPTION OF THE NON-LIMITING EMBODIMENTS

The non-limiting embodiments of the present technology can be better understood from the following description of some specific embodiments of the microwave communication apparatus with multi-channel radio frequency unit and continuous beam scanning on the examples of the apparatus implementation in the millimeter-wave point-to-point communication systems with high data throughput.

In a radio-relay communication system with beam-scanning antenna according to patent # RU2530330 deviation of an antenna beam direction is determined by a displacement of an active antenna element relative to an axis of a lens. And there is a fixed step in beam directions because it is impossible to place antenna elements of a switching group very close to each other due to final sizes of the antenna elements. Foresaid leads to non-uniform coverage area, i.e. to gain variation over an angle direction to an opposite transceiver station.

Figure 1:
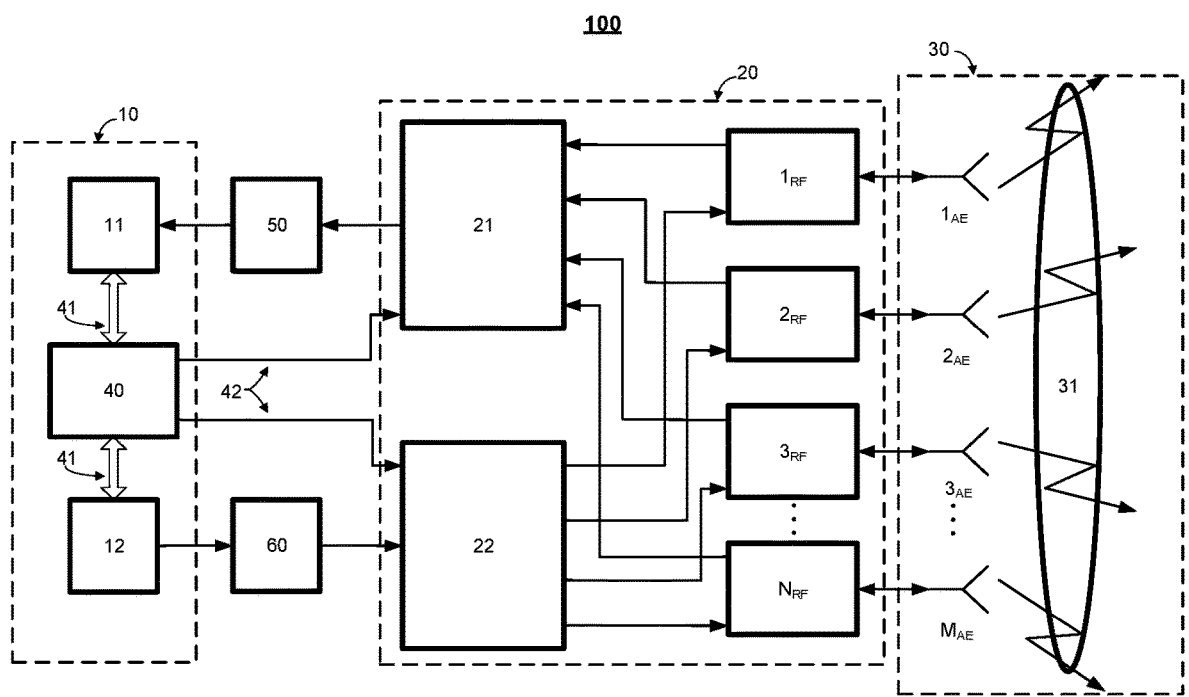
FIG. 1—a structure of known microwave station according to patent No RU2530330 (prior art).
Figure 2:
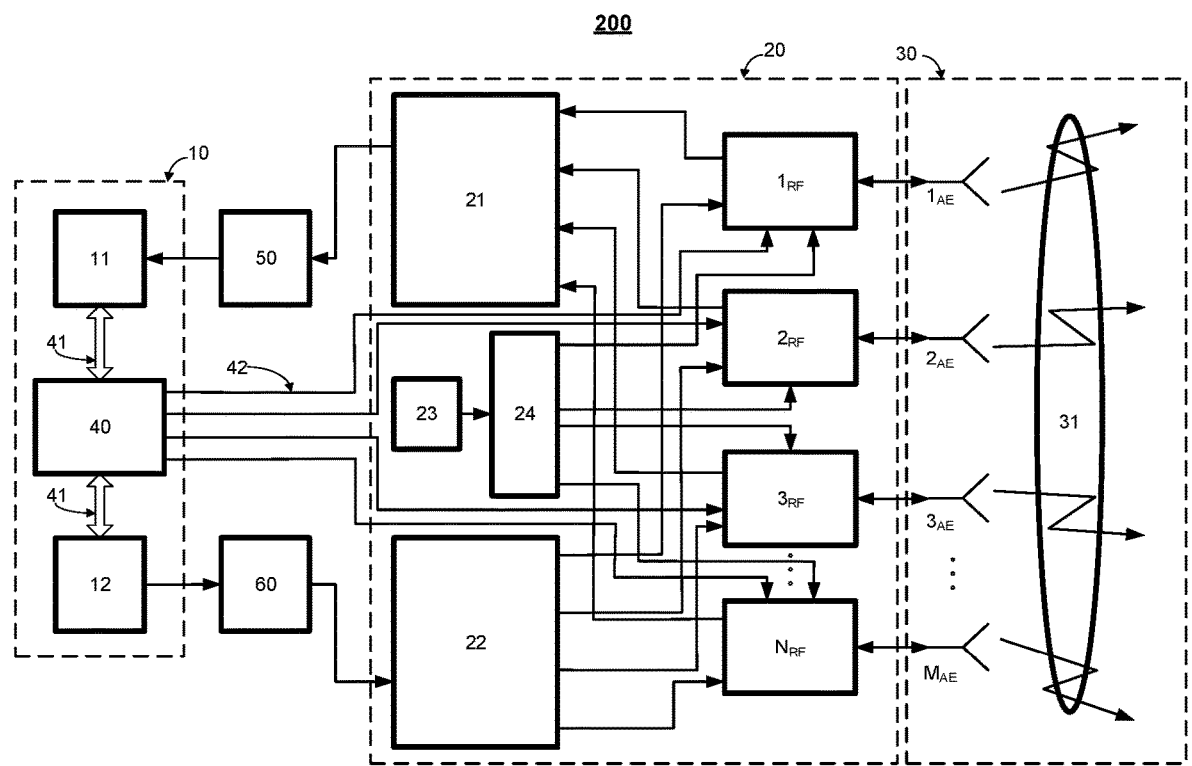
FIG. 2—a structure of a radio relay microwave station according to one of the embodiments of the non-limiting embodiments of the present technology.
Figure 3:
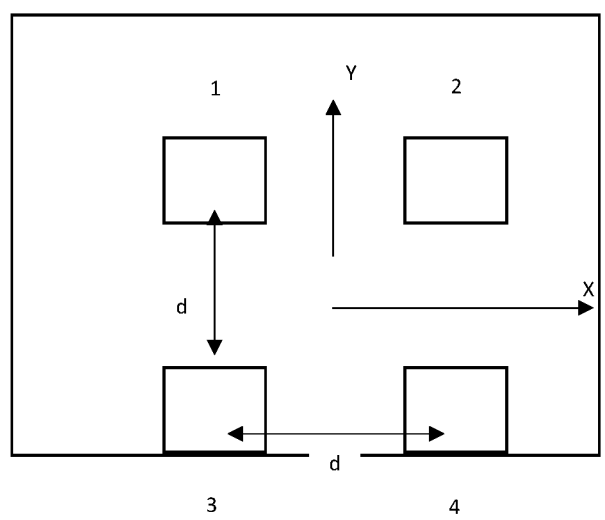
FIG. 3—an illustration of calculation of the phase center position of four antenna elements during the scanning according to one of the embodiments of the non-limiting embodiments of the present technology.

FIG. 2 shows the non-limiting embodiments of the present technology which eliminates the above disadvantage. The microwave communication apparatus comprises a digital modem (10), an ADC (50) and a DAC (60), a multi-channel radio frequency module (20) and a passive part of an antenna (30). The digital modem (10) comprises a receiving block (11), a transmitting block (12) and a beamforming module (40) connected to the receiving block (11) and to the transmitting block (12) through control channels (41) that are necessary for control information transmission used for calculation of a target spatial position of a beam by the beamforming module (40). The multi-channel radio frequency module (20) comprises a received signal distribution network (21), a transmitted signal distribution network (22), a common clock generator (23), a clock signal distribution network (24) and a plurality of radio frequency units (1 . . . NRF). The received signal distribution network (21) and the transmitted signal distribution network (22) are connected to the radio frequency units (1 . . . NRF) and with the receiving block (11) and the transmitting block (12) of the digital modem (10). The clock signal distribution network (24) is connected to the clock generator (23) and to all radio frequency units (1 . . . NRF), wherein each radio frequency unit comprises a voltage-controlled oscillator with a phase locked loop synthesizer based on a frequency synthesizer with a fractional and programmable divider, and variable gain blocks. More details of the structure of the radio frequency units are given below. The beamforming module (40) is connected to the radio frequency units (1 . . . NRF) through the command channels (42).

The passive part of the antenna (30) comprises a collimating device (31) and a plurality of antenna elements (1 . . . MAE), wherein each radio frequency unit is connected to the at least one antenna element.

Due to such structure a microwave communication apparatus (200) allows to feed a group of closely spaced antenna elements simultaneously and to form a beam of radiation pattern in a direction determined by a position of the common phase center of this group. It is necessary to have small distance between active antenna elements to prevent the beam from splitting into several directions.

Due to different powers of the same signal feeding different antenna elements (with phase synchronization between them) continuous scanning along the angle is provided. For example, due to corresponding power distribution of two antenna elements the phase center of this antenna elements may be in any point of a linear segment which connects these two antenna elements.

Figure 4:
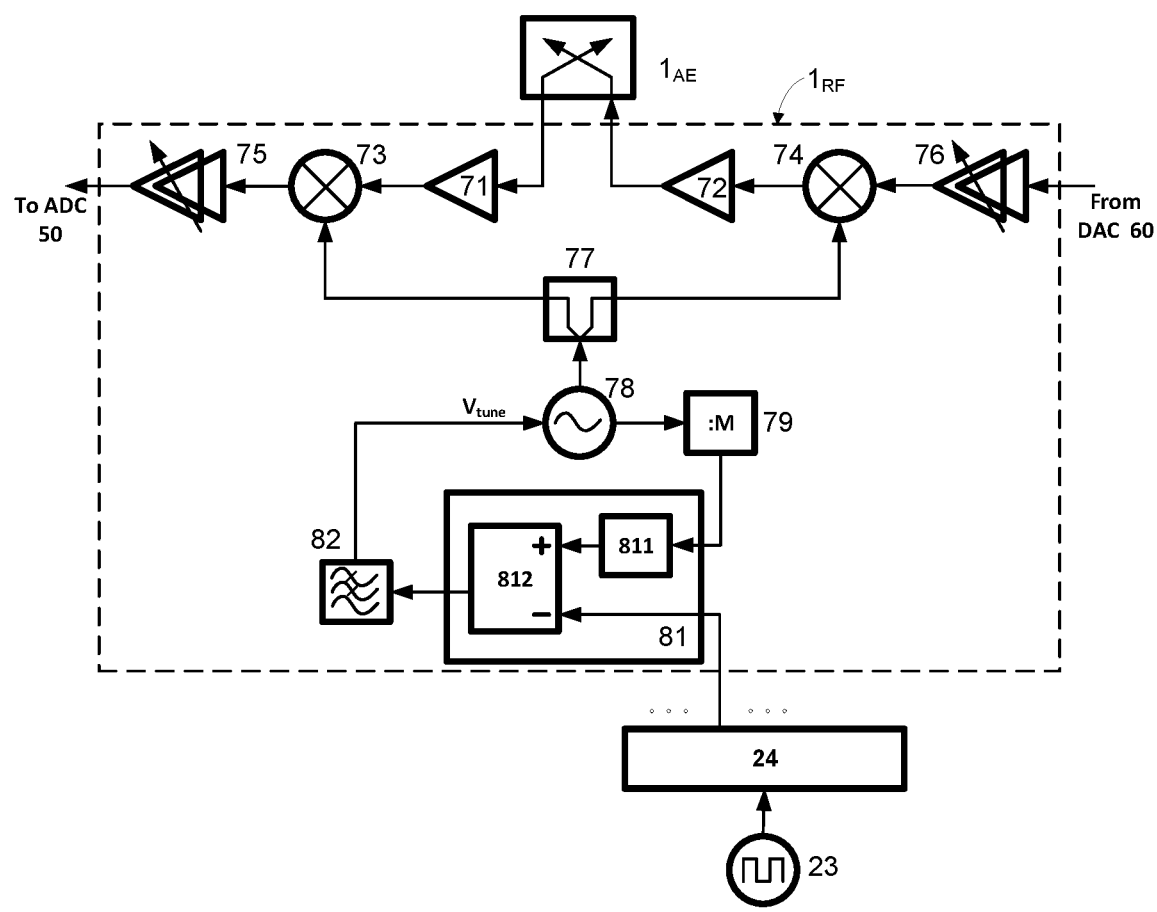
FIG. 4—a structure of radio frequency unit according to one of the embodiments of the non-limiting embodiments of the present technology.

FIG. 4 shows a structure of an antenna array of four antenna elements placed in corner points of a square, to illustrate the above. A distance between antenna elements denotes as d, and the center of coordinate system is placed in the center of a group of antenna elements. When antenna elements with different power weight coefficients Ai are fed simultaneously the phase center of this elements is in a point calculated by the next equations:

$$\text{along the } X \text{ axis: } \frac{d}{2}\left(\frac{A_2 + A_4}{A_\Sigma} - \frac{A_1 + A_3}{A_\Sigma}\right)$$

$$\text{along the } Y \text{ axis: } \frac{d}{2}\left(\frac{A_1 + A_2}{A_\Sigma} - \frac{A_3 + A_4}{A_\Sigma}\right),$$

where A1, A2, A3, A4—power weight coefficients, and AΣ—the sum of this coefficients or total power input to the antenna.

coefficients may be constant. In this case there is a power distribution between four antenna elements. When the whole power is concentrated only in one antenna element—it is an antenna with switched beam and corresponding phase centers coincide with phase centers of the antenna elements. Feeding of all the antenna elements simultaneously and equally the phase center is in the point with coordinates (0, 0), i.e. in the center of the antenna array. It allows to form the center beam that is not possible in a switched beam antenna with square arrangement of four antenna elements where this antenna has a drop in gain.

Feeding of only two of four antenna elements (with the same power weight coefficients), for example No 1 and 2, the phase center is displaced along the axis OY, but stays fixed along the axis OX. It allows to deviate the beam only in one angle dimension. The same way the arbitrary relation between power weight coefficients of several feeding antenna elements may be studied. In this case the phase center may be arbitral inside the square area bounded by four antenna elements. It means that during scanning process the maximum of the beam has an arbitral direction, or the scanning converts from discrete to continuous.

A coverage area is limited by the outline shape formed by antenna elements (in this case it is square shape). The requirement is to determine the allowable maximum of a distance between antenna elements. Beams of each antenna element are independent when the distance is large and there are two beam directions instead of one when the antenna elements feed simultaneously. The distance may be determined corresponding to the type and size of the antenna collimating device and corresponding to the type and the material of the antenna elements and other characteristics. However, it is difficult to determine a common rule. Instead, it is easier to determine the minimum level of overlap between neighboring beams that are formed during the independent feeding by neighbor elements. The allowable level of overlap between beams is −3--4 dB and the minimum is −5 dB. Check of the level of overlap between beams should be made by special programs of electrodynamic simulations.

Forming of two beams is appropriate for point-to-multipoint communication systems. In an embodiment of the technology continuous beam scanning is provided by each beam.

Further conclusions are provided studying microwave communication apparatus in point-to-multipoint communication systems operating for transmission. In this case for different power distributions the power of the sum of all antenna elements may not be constant. Usually it is the maximum level of power output that is provided by each radio frequency unit in multi-channel radio frequency module and is determined by characteristics of an output power amplifier. When the only one antenna element is fed the maximum power would be determined to this amplifier. But when two antenna elements are fed the common power of the antenna is doubled. And when four antenna elements with the same power weight coefficients are fed it is four times more powerful antenna. When the feeding coefficients of different antenna elements are different the requirement is to fix the antenna element with the maximum coefficient and supply the corresponding antenna element with the corresponding maximum power and the powers of the other antenna elements should be reduced proportional to the beamforming weights.

For the receiver case the aperture of the antenna determines the input power, while a coefficients distribution along the antenna elements determines the receiving direction and the position of the phase center during operation. In this case antenna operation is described assuming that the sum of all power weight coefficients is fixed.

FIG. 4 shows another embodiment of the technology. There is an architecture of a radio frequency unit (1NRF) with direct frequency conversion. It means that when the signal is transmitted it is transferred to a high carrier frequency from the baseband frequency with the only one voltage-controlled oscillator. When it is necessary to provide some amplitude distribution over the antenna elements the radio frequency unit comprises a power amplifier (72), an up-conversion mixer (74), variable gain blocks in the transmitter chain (76), and a low-noise amplifier (71), a down-conversion mixer (73), and variable gain blocks in the receiver chain (75). The variable gain blocks in the transmitter chain (76) and the variable gain blocks in the receiver chain (75) are controlled by the beamforming module (40) through the command channels (42).

FIG. 4 shows a radio frequency unit (1RF) with the voltage-controlled oscillator comprising a power divider (77), a voltage-controlled oscillator (78), a frequency divider (79), a phase locked loop filter (82), a frequency synthesizer (81) which comprises a fractional and programmable divider (811) and phase frequency detector (812). Whereas the fractional and programmable divider (811) is also controlled by the beamforming module (40) through the command channels (42). It allows to form the desired phase distribution over the antenna elements or to provide phase synchronization between them.

The advantages of such phase control method are especially important in millimeter wave frequencies. All methods of phase control at radio frequency output may be classified into three groups:

1. Controlling the phase of the signal along the radio frequency front-end;
2. Controlling the phase along the intermediate frequency signal path up to transferring to the carrier frequency;
3. Controlling the phase along the path of the local oscillator.

Controlling the phase along the radio frequency path is often pointless due to absence or high cost of radio frequency phase shifters operating in the millimeter wave band. Besides these phase shifters introduce high insertion losses.

The second method for controlling the phase up to transfer the signal on a carrier frequency is useful often because a transmitter transfers a signal from a zero frequency where the signal is wideband. Thus, it is necessary to use a variable delay line instead of a phase shifter that is not so easy.

The third method is the most preferable, but such a method has several ways of realization.

Using a classical phase shifter is not desired. Besides a voltage-controlled oscillator is often incorporated in an integrated circuit of a transceiver or a mixer and there is no opportunity to integrate there anything else. One of the embodiments of the technology is to use a phase shifter in a feedback network of a phased locked loop synthesizer. It means that if there is a voltage-controlled oscillator (78) or a frequency divider (79) the phase shifter is in a feedback network of the voltage-controlled oscillator (78) or the frequency divider (79). In the first case the phase shifter should be very high frequency, and, in another case, a phase control step is rather rough because the frequency is divided into large values. Thus, the present technology discloses another method for a phase adjustment of signals at outputs of radio frequency units.

This alternative method for controlling the phase at outputs of a radio frequency unit is in a small short deviation of a fractional frequency divider in a frequency synthesizer of a phase locked loop. Then it is easy to calculate that a phase taper of a voltage-controlled oscillator is proportional to frequency deviation at a phase-frequency detector multiplied to the duration of the divider deviation.

Modern integrated circuits of frequency synthesizers have very good accuracy for the coefficient of a frequency divider. For example, in an integrated circuit of a frequency synthesizer ADF4158 by Analog Devices company the minimum step of a divider is $$\Delta N = \frac{1}{2^{25}},$$

that allows to minimize a frequency deviation step to 30 Hz if the frequency of the voltage-controlled oscillator is 1 GHz. Modern apparatuses allow to control the duration of gain deviation to tens and units of microseconds. With this background a step of a phase deviation may be reduced to a tenth of a degree.

The apparatus realized according to FIG. 2 and FIG. 4 operates in the following way. The receiving block (12) of the digital modem (10) forms a digital signal based on data which must be transferred. This signal flows through the DAC (60) to form an analog signal. Then the transmitted signal distribution network (22) divides the signal into several branches. In a specific embodiment these split signals are equal in amplitude. Each part of the signal transfers to a radio frequency unit (1RF . . . NRF) where there is power adjustment of the signal and which transfers this signal to a carrier frequency. Same time the beamforming module (40) implemented as digital logic blocks in the digital modem (10) forms command signals. These signals are formed on a special method. The method is based on the data which is got through the control channels (41) from the receiving block (12) of the digital modem (10). Command signals are to form a radiation pattern beam of desired direction. The command signals are transferred through the command channels (42) from the beamforming module (40) to the radio frequency units (1RF . . . NRF). The command channels are used to set the divider coefficient of the frequency synthesizer and the variable gain blocks in the transmitter chain. As the result the signals of the radio frequency units (1RF . . . NRF) outputs are of the requirement power. These signals may be equal or different. To transfer the signals on a carrier frequency of the radio frequency units (1RF . . . NRF) an up-conversion mixer (74) and the voltage-controlled oscillator (78) are used. A clock generator (23) is common for all the radio frequency units (1RF . . . NRF) and a clock signal flows through the clock signal distribution network (24). Each copy of a reference-input signal and a feedback signal of the voltage-controlled oscillator (78) flow on the inputs of the frequency synthesizer (81). Due to controlling of the integrated fractional and programmable divider (811) and a short time division value deviation of a frequency synchronization of signal phases of all radio frequency units (1RF . . . NRF) are provided. Moreover, arbitrary phase distribution of signals at each radio frequency unit outputs (1RF . . . NRF) is possible. As a result transmitting signals feed antenna elements (1a . . . MAE) corresponding to the formed phase-amplitude distribution. Then the collimating device (31) (for example, a lens) fixes a beam in a direction that is determined by the set distribution.

The apparatus operates the same way to receive the signal, but processing is in inverse order. Formed phase-amplitude distribution provides a signal combining of all radio frequency units (1RF . . . NRF) by received signal distribution network (21) and allows to transmit the signal to the digital modem (10) for further demodulation.

The non-limiting embodiments of the present technology is not limited by the described embodiments that are disclosed only in description purposes and cover all possible modifications and variations within the scope of the non-limiting embodiments of the present technology as it is defined by the foregoing claims.

The invention claimed is:

1. A microwave communication apparatus comprising at least two antenna elements, at least two radio frequency units, wherein each of the radio frequency units is connected with at least one antenna element, a digital modem with receiving and transmitting blocks, a received signal distribution network connected with the radio frequency units and with the receiving block of the digital modem, said received signal distribution network capable of forwarding received signal from the radio frequency units through an analog-to-digital converter to the receiving block of the digital modem, a transmitted signal distribution network connected with the radio frequency units and with the transmitting block of the digital modem, said transmitted signal distribution network capable of forwarding transmitted signal from the transmitting block of the digital modem through a digital-to-analog converter to the radio frequency units, and a beamforming module realized as a digital logic block and connected with said receiving and transmitting blocks of the digital modem through control channels, wherein said microwave communication apparatus also comprises a clock generator and a clock signal distribution network connected with the clock generator and with the radio frequency units, wherein each of the radio frequency units comprises variable gain blocks and a voltage-controlled oscillator with a phased locked loop synthesizer with a fractional and programmable divider, wherein the beamforming module is connected with the radio frequency units through command channels.

2. The communication apparatus according to claim 1 additionally comprising a collimating device with a focal plane.

3. The communication apparatus according to claim 2 in which the antenna elements are located on the focal plane of the collimating device.

4. The communication apparatus according to claim 3 where a distance between the antenna elements is selected to provide less than −5 dB overlap between main beams of radiation patterns formed by each of the antenna element fed individually.

5. The communication apparatus according to claim 2 in which the collimating element is selected from a group consisting of a parabolic dish, a thin dielectric lens, a Luneburg lens, and a hemielliptic lens with an extension, wherein a focal plane of the hemielliptic lens coincides with a back plane of the extension.

6. The communication apparatus according to claim 1, wherein one of the radio frequency units is a radio frequency transmitter while the others are radio frequency receivers.

7. The communication apparatus according to claim 1, wherein the radio frequency units are radio frequency transceivers.

8. The communication apparatus according to claim 1, wherein the radio frequency units are based on one of the following architectures: direct frequency conversion architecture, superheterodyne architecture wherein at least one voltage-controlled oscillator is programmed over frequency.

9. The communication apparatus according to claim 1, wherein the antenna elements have two orthogonal polarizations.

10. The communication apparatus according to claim 9, wherein an output port for one of the two polarizations of each antenna element is connected with a transmitting portion of one of the radio frequency units, while a port for another polarization is connected with a receiving portion of the same radio frequency unit.

11. The communication apparatus according to claim 1 operating in time division mode for receive and transmit signal separation.

12. The communication apparatus according to claim 1, wherein received signal and transmitting signal distribution networks comprise at least one of the following elements: a switch, a power splitter/combiner.

13. The communication apparatus according to claim 1 additionally comprising microwave switches between the antenna elements and at least one of the radio frequency units.

14. The communication apparatus according to claim 1, wherein carrier frequency signals on outputs of the radio frequency units are synchronized in phase.

15. The communication apparatus according to claim 1, wherein carrier frequency signals on outputs of the radio frequency units are equal in amplitude.

16. The communication apparatus according to claim 1, wherein all not the active radio frequency units are turned off.

17. The communication apparatus according to claim 1 additionally comprising several analog-digital and digital-to-analog converters and the receiving and transmitting signal distribution networks are implemented as digital logic blocks in the digital modem.

18. The communication apparatus according to claim 1 operating as a point-to-point or a point-to-multipoint communication system.

19. The communication apparatus according to claim 1 operating in a 71-76 GHz band.

* * * * *